(12) United States Patent
Hopkins

(10) Patent No.: US 6,436,213 B1
(45) Date of Patent: Aug. 20, 2002

(54) ENHANCED ELECTRO-DEPOSITION DEVICE AND METHOD

(75) Inventor: David H. Hopkins, Escondido, CA (US)

(73) Assignee: PTI Advanced Filtration, Inc., Oxnard, CA (US)

( * ) Notice: Subject to any disclaimer, the term of this patent is extended or adjusted under 35 U.S.C. 154(b) by 0 days.

(21) Appl. No.: 09/645,182

(22) Filed: Aug. 24, 2000

(51) Int. Cl.⁷ .............................................. B32B 31/16
(52) U.S. Cl. ..................... 156/73.1; 156/269; 156/308.2
(58) Field of Search ............................... 156/73.1, 203, 156/250, 269, 308.2, 580.1, 580.2

(56) References Cited

U.S. PATENT DOCUMENTS

| | | | |
|---|---|---|---|
| 4,061,264 A | 12/1977 | Bartels et al. .............. 228/145 |
| 4,141,481 A | 2/1979 | Van Petten .................. 228/145 |
| 4,410,383 A | 10/1983 | Lipari ........................ 156/73.1 |
| 4,767,426 A | 8/1988 | Daly et al. ..................... 55/487 |
| 5,512,172 A | * 4/1996 | Marble ........................ 210/232 |
| 5,846,360 A | * 12/1998 | Gil ............................. 156/73.1 |
| 5,971,160 A | 10/1999 | Abdulmassih et al. ...... 209/405 |
| 6,228,274 B1 | * 5/2001 | Deibel ......................... 210/798 |

* cited by examiner

Primary Examiner—James Sells
(74) Attorney, Agent, or Firm—Pillsbury Winthrop LLP

(57) ABSTRACT

Embodiments of the present invention relate to a membrane assembly useful in an electro-deposition coating system and a method for constructing such a membrane assembly. The membrane assembly may include a membrane sheet, a guide and a frame. In an embodiment of the invention, the membrane assembly may be formed in a tubular shape by ultrasonically welding a membrane sheet along a spiral seam and placing the membrane sheet between a guide and frame formed form extruded net tubing. Alternative embodiments of the invention may incorporate different seam shapes and manufacturing and joining methods.

19 Claims, 3 Drawing Sheets

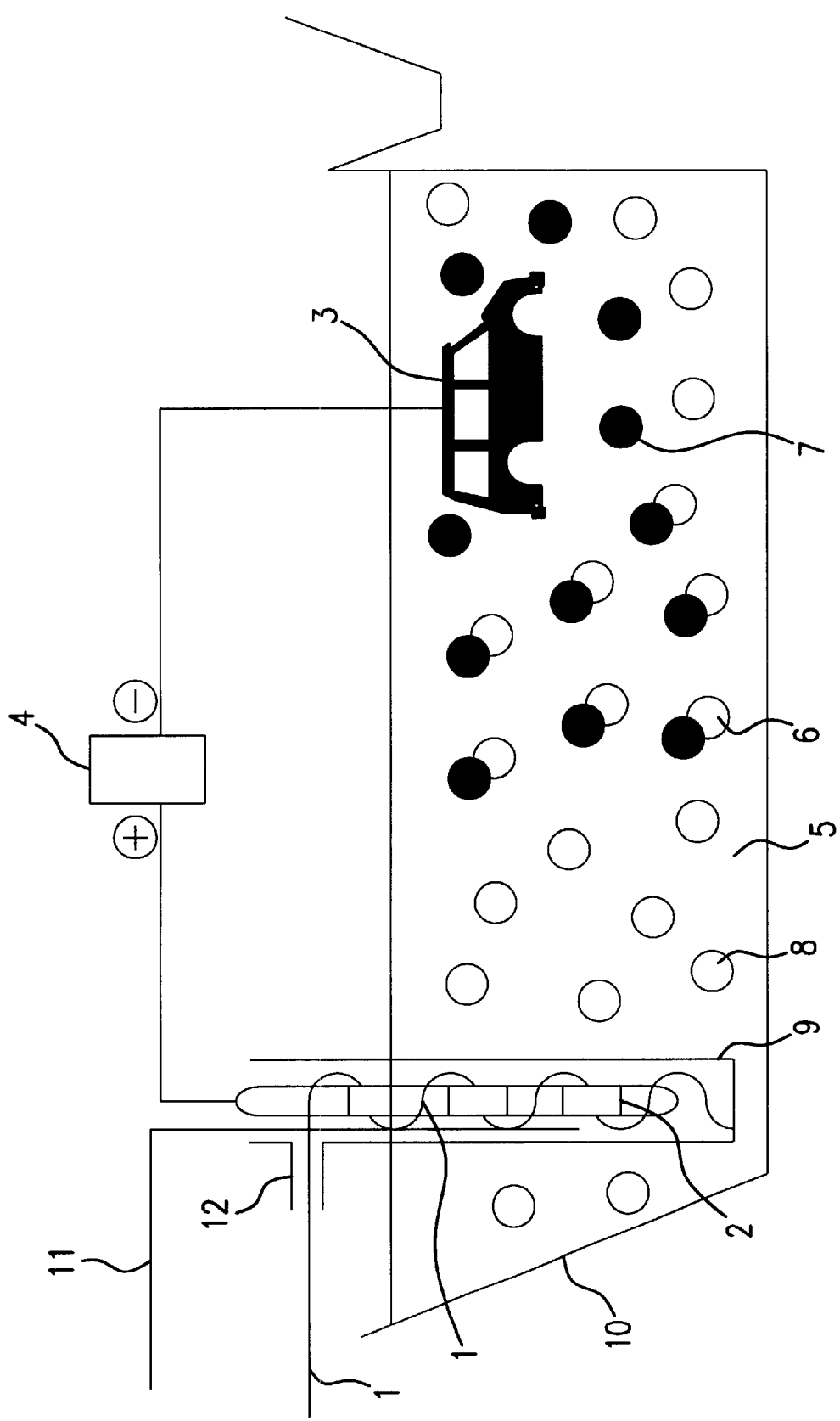

ENHANCED ELECTRO-DEPOSITION DEVICE AND METHOD

BACKGROUND

An electro-deposition system may include an electrode immersed in a solution of coating material, solvent and a neutralizing agent. As the coating material is deposited on the surface of the electrode, the supply of coating material in solution must be replenished. Otherwise, the concentration of neutralizing agent in the solution may increase and create "pin-hole" defects in the electro-deposition coating. An electro-deposition system for solving this problem is described in U.S. application Ser. 09/183,547, now U.S. Pat. No. 6,264,809 to Cheng H. Lee (the "Lee system").

In an embodiment of the Lee system, a tubular electrode is enclosed in a tubular membrane assembly. The tubular membrane assembly may consist of an outer frame and an inner guide, between which is contained a permeable membrane. The inner and outer walls may be made of a non-permeable rigid material and may include apertures through which coating material may pass. The coating material may pass through a window in the outer wall of the frame, permeate through the membrane and then pass through a window in the inner wall of the frame. Upon passing through the tubular membrane assembly, the coating material may dissolve into the solution in which the electrolyte is immersed.

BRIEF DESCRIPTION OF THE DRAWINGS

FIG. 1 depicts an electrodeposition coating system according to an embodiment of the present invention;

DETAILED DESCRIPTION

Figure 2A:
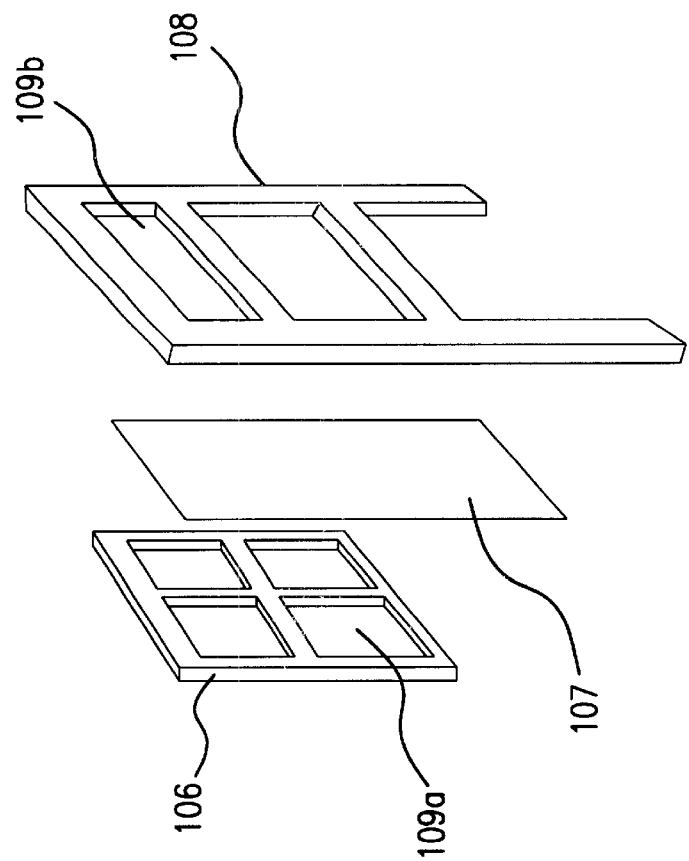
FIG. 2A illustrates a cross-section of the. wall of a tubular membrane assembly of FIG. 2 taken across the line A—A.

Embodiments of the present invention relate to a membrane assembly useful in an electro-deposition coating system and a method for constructing such a membrane assembly. The membrane assembly may include a membrane sheet, a guide and a frame. In an embodiment of the invention, the membrane assembly may be formed in a tubular shape.

FIG. 1 illustrates a typical application for the membrane assembly of the present invention. The membrane assembly 1 surrounds an anode 2. The anode 2 may be made of stainless steel and may be cylindrical in shape. An object to which material, such as paint, is being electro-deposited serves as the cathode 3. In alternative embodiments of the system, the cathode 3 and the anode 2 may be reversed, i.e. the objected to which material is being electro-deposited may serve as the anode 2 and the membrane assembly 1 may surround the cathode 3. Where the cathode is to be coated, the coating material is generally an anion. Conversely, where the anode is to be coated, the coating material is generally a cation. For the remainder of the discussion, it will be assumed that the system uses an anion coating material and that the element being coated is the cathode. However, the present invention relates to both anodic and cathodic systems.

The anode 2 is electrically connected to the positive terminal of a DC power source 4, such as a battery rectifier. The cathode 3 is electrically connected to the negative terminal of the DC power source 4. The membrane assembly 1, the anode 2 and the cathode 3 are at least partially submerged in an aqueous solution 5 containing solubilized deposition material 6. The aqueous solution 5 may be contained in a electrodeposition tank 10. The aqueous solution 5 generally contains a deposition material 7, a solvent (such as water) and a solubilizer 8. The solubilizer 8 increases the ionization of the solubilized deposition material 6. In a system in which the cathode 3 is the element being coated, the solubilizer 8 may be an acid, such as acetic acid. In an alternative system in which the anode is being coated, the solubilizer may be a base such as triethylamine. Additional deposition material may be continuously added to the solution as deposition material 7 is taken out of the aqueous solution 5 at the cathode 3.

As the electrodeposition process continues, solubilized deposition material 6 comes out of solution (as shown by deposition material 7, which is unsolubilized). Solublizer 8 is left behind in solution. Changes in the concentration of solubilizer 8 in the aqueous solution 5 may affect the quality of the electrodeposition coating on the cathode 3, causing "pinhole" type defects on the surface of the cathode coating. Therefore, it is desirable to control the concentration of the solubilizer 8 in the aqueous solution 5.

The membrane assembly 9 may be part of a system for controlling the concentration of solubilizer 8 in the aqueous solution 5. The membrane assembly may include an anolyte supply tube 11 and an anolyte return 12. The anolyte supply tube 11 supplies fresh solubilizer solution to the interior area of the membrane assembly 9. The solubilizer solution supplied by the anolyte supply tube 11 may have a concentration of solubilizer 8 equal to that desired in the aqueous solution 5. Furthermore, the wall of the membrane assembly 9 may be permeable to solubilizer 8. In such an embodiment, if the concentration of solubilizer 8 in the aqueous solution 5 exceeds the desired concentration, solubilizer can flow through the wall of the membrane assembly 9 into the solubilizer solution in the interior of the membrane assembly. Spent solubilizer solution is removed from the interior of the membrane assembly 9 via anolyte return 12. The spent solubilizer solution may be treated and returned for use through the anolyte supply tube 11.

In such a system, the membrane assembly 9 may also have a rifled bottom cap (see FIG. 2) and the anolyte supply tube 11 may supply fresh solubilizer to a reservoir in the bottom cap. The effect of introducing solubilizer solution to the membrane assembly 9 in this way is that the solubilizer solution may travel upward through the interior of the membrane assembly 9 in a vortex. This vortex may create a scrubbing effect that removes oxygen and other impurities from the surface of the anode 2 to prevent or reduce corrosion.

Figure 2:
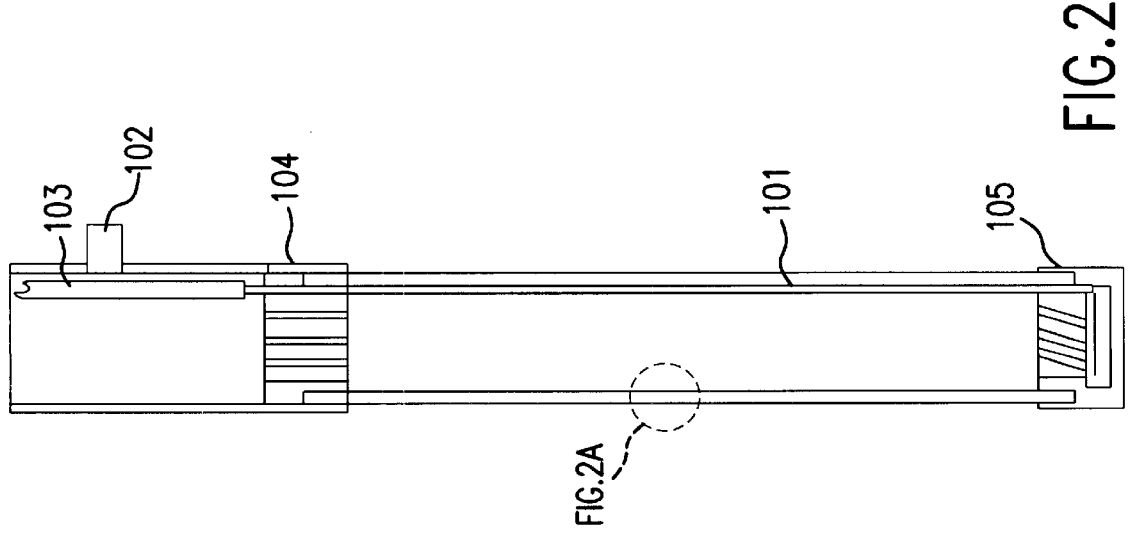
FIG. 2 illustrates a tubular membrane assembly according to an embodiment of the present invention.

FIG. 2 illustrates an embodiment of the membrane assembly of the present invention. In the pictured embodiment, the membrane assembly shape is tubular. The assembly consists of a membrane assembly wall 101, an anolyte return 102, an anolyte supply tube 103, a top cap 104 and a bottom cap 105. The top cap may have an aperture through which an electrode (an anode or a cathode) may be inserted. The bottom cap 105, the top cap 104 or both may be grooved so as to receive the membrane assembly wall 101. The membrane assembly wall 101 may consist of three layers as shown in FIG. 2A—an outer frame 106, a membrane 107 and an inner guide 108. The frame 106 and the guide 108 may include a plurality of apertures 109a, 109b through which solubilizer 8 may pass. The membrane 107 may be selectively permeable so as to allow solubilizer to pass from outside the membrane assembly to inside the membrane assembly in order to lower the concentration of solubilizer in the aqueous solution 5 or from inside the membrane assembly to the aqueous solution 5 outside the membrane assembly in order to raise the concentration of solubilizer in the aqueous solution 5.

The membrane 107 is preferably made of a material that does not react with the coating material, solvent or solubilizer. An examples of a suitable membrane material is the ULTREX AMI-7001 anionic membrane manufactured by Membranes International, Inc. of Glen Rock, N.J. The chosen material may expand when placed in the solution of coating material, solvent and neutralizing agent. When the membrane assembly is constructed and subsequently placed in the solution, a problem may arise if the membrane 107 expands significantly after placement in the solution. As the membrane 107 expands, portions of the membrane 107 may extrude through the apertures 109a and 109b in the guide 108 or frame 106. This may reduce the contact area between the membrane surface and the coating material, slowing permeation of coating material through the membrane 107. Moreover, coating material solids or contaminants may accumulate in pockets between extruded portions of the membrane 107 and the guide 108 or frame 106, further reducing electro-deposition efficiency.

In one embodiment of the invention, this problem is solved by pre-expanding the membrane 107. The membrane 107 may be pre-expanded by wetting a flat sheet of the membrane material in a solution of about 30–50% by weight of glycerin or an aqueous solution of polyhydroxy compounds. The wetting process involves soaking a flat sheet of membrane material in the solution for at least about 10 minutes. The pre-expanded membrane 107 is then rolled or formed into the desired shape of the membrane assembly. For example, the pre-expanded membrane 107 may be rolled into a tubular shape of a specified inner or outer diameter. Alternatively, the pre-expanded membrane 107 may be expanded after it has been formed into the desired membrane assembly shape.

Figure 3B:
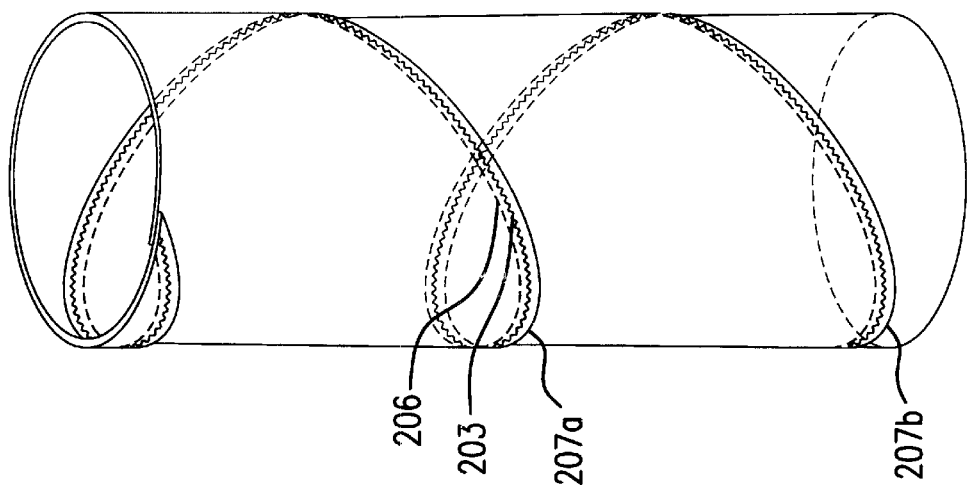
FIG. 3B illustrates a membrane sheet formed into a desired membrane assembly shape according to an embodiment of the present invention.
Figure 3A:
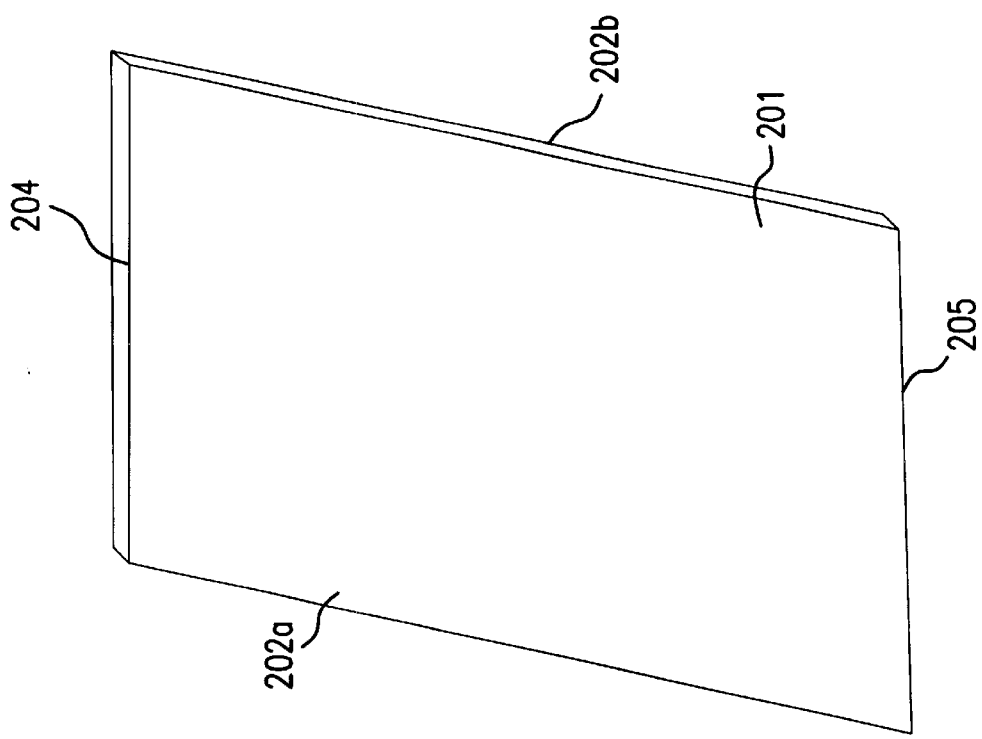
FIG. 3A illustrates a membrane strip prior to its being formed into a desired membrane assembly shape according to an embodiment of the present invention.

FIGS. 3A and 3B illustrate in greater detail the construction of a membrane having a desired membrane assembly shape. In a preferred embodiment the membrane assembly shape is tubular and the membrane is formed into this shape by joining its sides along a spiral shaped seam. FIG. 3A depicts a membrane 201 that has not yet been formed into the desired membrane assembly shape. FIG. 3B illustrates a membrane that has been formed into a desired tubular membrane assembly shape with a spiral-shaped seam. To form the membrane 201 into the desired membrane assembly shape, the sides 202a and 202b of the membrane 201 are brought together so that portions of the membrane 201 proximate each of the sides 202a and 202b overlap.

The shape of the membrane 201 depends at least in part upon the desired seam shape. The membrane 201 is rhomboidal in shape in FIG. 3A to yield a spiral-shaped seam 203. In an embodiment in which a vertical seam is desired, the membrane 201 may be rectangular in shape. Where a continuous sheet is used, the rhomboidal shape may be produced from a standard rectangular continuous sheet by cutting the leading edge of the rectangular sheet at an angle to create a new leading edge 204 and feeding the continuous sheet at a corresponding angle to the feed direction of the continuous sheet.

The size of the membrane is determined by the desired size of the membrane assembly shape. For example, the vertical distance between leading edge 204 and trailing edge 205 may be equivalent to the desired height of the membrane when formed into the desired membrane assembly shape. Although FIG. 3A shows both leading edge 204 and trailing edge 205, it should be understood that the membrane 201 may be in the form of a continuous sheet which lacks a leading edge 204, a trailing edge 205 or both prior to being formed into the desired membrane assembly shape. The membrane 201 may be cut so as to have a leading edge 204 and/or a trailing edge 205 after the membrane 201 is formed into the desired membrane assembly shape. The horizontal distance between corresponding points on sides 202a and 202b may be substantially equivalent to the sum of the desired circumference of the membrane when formed into the desired membrane assembly shape and the horizontal width of the overlap region 206. In an embodiment in which the membrane assembly has a tubular shape, the inside diameter of the membrane after it is formed into the tubular shape is preferably between about 2 inches and 3.5 inches.

The area of the overlap region 206 may be chosen so that the inner diameter of the membrane assembly shape is a specified value and may depend on the type of method used to bond the overlapping membrane material together. Methods of bonding the sides of the membrane assembly may include thermal welding, ultrasonic welding, tacking or adhesive bonding. In an embodiment in which adhesive bonding is used, adhesive is placed between the overlapping sides 202a and 202b as well as at the over the top of the outer side 202b. Where thermal welding is used, weld material may be placed so as to create a fillet weld. Considerations in choosing a particular bonding method include the thermal and chemical characteristics of the material from which the membrane 201 is made, the chemical environment in which the membrane assembly 9 will be used, the mechanical stress and/or strain to which the membrane assembly 9 may be subjected in its eventual application, cost, ease of manufacturing, etc. For example, ultrasonic welding may be particularly suitable for membrane materials that are heat-sensitive and/or applications in which the membrane assemblies will be immersion in aqueous solutions 5 with which an adhesive is incompatible.

In an embodiment in which ultrasonic welding is used, the sides 202a and 202b are brought together to create the overlap region 206. The overlap region may have a width of approximately ½ inch. A portion of the overlap region 206 may placed between a fixture and a horn such that the horn and the fixture each are in contact with the surface of the membrane 201 proximate a side 202a or 202b. The horn may be caused to vibrate at high frequency by a converter, which may transform alternating current electrical energy into high frequency kinetic energy. A booster may be placed between the converter and the horn to increase the amplitude of the vibration. The frequency of vibration produced by the converter may be on the order of 15–40 kHz. The high frequency vibration may create friction at the interface between the sides 202a and 202b which causes bonding sites (denoted by an "x" in FIG. 3B) to form between the surfaces of the sides 202a and 202b. A continuous seam 203 is formed by feeding the overlap region 206 through the area between the horn and the fixture in a direction substantially perpendicular to the length of the horn (i.e., the direction of travel of the seam).

In an embodiment of the present invention, sides 202a and 202b of the membrane 201 may overlap to form a spiral seam 203 (as shown in FIG. 3). In such an embodiment, the dimensions of the spiral shape may be chosen so that the vertical distance between successive rings 207a and 207b is approximately 6 inches. Alternatively, the sides 202a and 202b of the membrane 201 may overlap to form a continuous vertical seam or a seam of another convenient shape. The membrane may be formed into a tubular shape by placing a pre-cast continuous sheet of membrane material around a cylindrical mandrel. The mandrel has an outside diameter substantially equal to the desired inside diameter of the membrane in its final tubular form. Alternatively, the pre-cast continuous sheet may be shaped inside a form whose inside diameter is approximately equal to the outside diameter of the desired membrane assembly shape. The welded membrane 201 may then be placed inside an outer frame 106 and outside an inner guide 108. Both the outer frame 106 and the inner guide 108 may be made from polypropylene extruded net tubing. The outer diameter of the inner guide 108 and the inner diameter of the outer frame 106 may be chosen so as to interfere slightly so that the parts press fit together. Alternatively, the diameters of the inner guide 108 and outer frame 106 may be chosen so as not to interfere and the membrane 201, inner guide 108 and outer frame 106 may be held in place relative to each other by the top end cap 104 and the bottom end cap 105.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A method for forming a membrane assembly, the method comprising:

shaping a membrane sheet having a first side and a second side, such that the first side and the second side overlap at a spiral-shaped seam;

bonding said first side and said second side at said seam to form a bonded membrane; and placing said bonded membrane between an inner guide and an outer frame.

2. The method of claim 1, wherein said bonded membrane has a tubular shape.

3. The method of claim 2, wherein said inner guide and said outer frame each have a tubular shape.

4. The method of claim 2, wherein said tubular shape has an inside diameter between about 2 and 3.5 inches.

5. The method of claim 1, wherein said first side and said second side overlap by about ½ inch.

6. The method of claim 1, wherein said shaping includes wrapping said membrane sheet around a mandrel.

7. The method of claim 1, wherein said bonding includes ultrasonic welding.

8. The method of claim 7, wherein said seam has a direction of travel, and said ultrasonic welding further includes positioning an ultrasonic welding horn substantially perpendicular to the direction of travel of said seam and feeding said seam along said direction of travel between said ultrasonic welding horn and a fixture.

9. The method of claim 1, further including cutting said membrane sheet from a continuous membrane sheet.

10. The method of claim 9, wherein said cutting occurs after said shaping.

11. The method of claim 1, wherein said membrane sheet is made of a thermoplastic material.

12. The method of claim 1, wherein said membrane sheet is pre-expanded.

13. The method of claim 1, wherein said shaping includes cutting said membrane sheet from a continuous sheet of membrane material.

14. The method of claim 13, where said membrane sheet is cut into a rhomboidal shape.

15. The method of claim 1, further including pre-expanding said membrane.

16. A method for forming a membrane assembly, the method comprising:

shaping a membrane sheet having a first side and a second side, such that the first side and the second side overlap at a seam;

ultrasonically welding said first side and said second side at the seam to form a bonded membrane; and placing the bonded membrane between an inner guide and an outer frame.

17. The method of claim 16, wherein the seam has a spiral shape.

18. The method of claim 16, wherein the seam has a vertical shape.

19. The method of claim 16, further including pre-expanding said membrane.

\* \* \* \* \*